L. E. ROBY & P. L. HATFIELD.
FERTILIZER DISTRIBUTER.
APPLICATION FILED AUG. 11, 1915.
1,185,133.
Patented May 30, 1916.
4 SHEETS—SHEET 3.
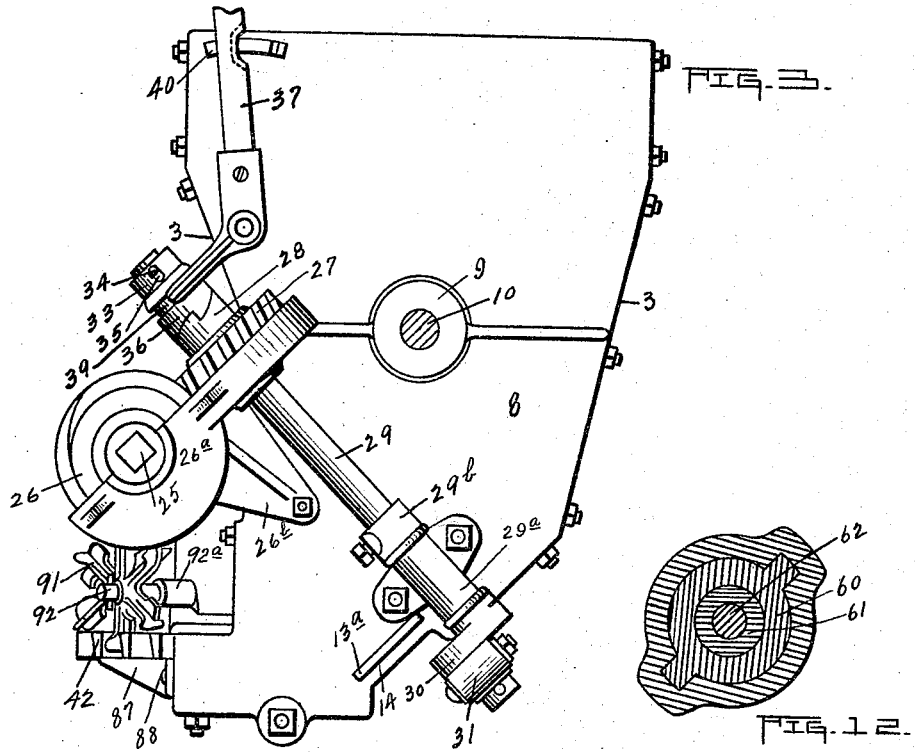
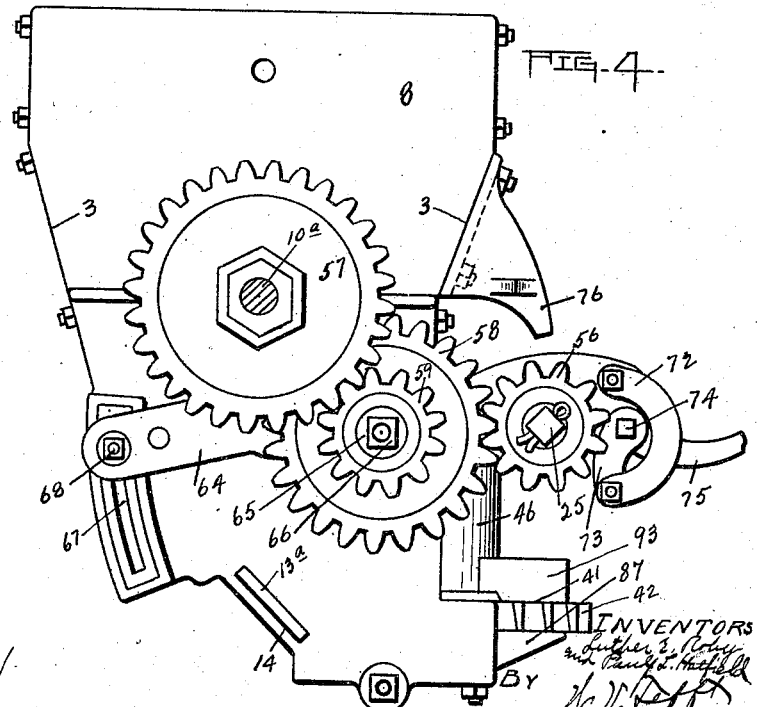

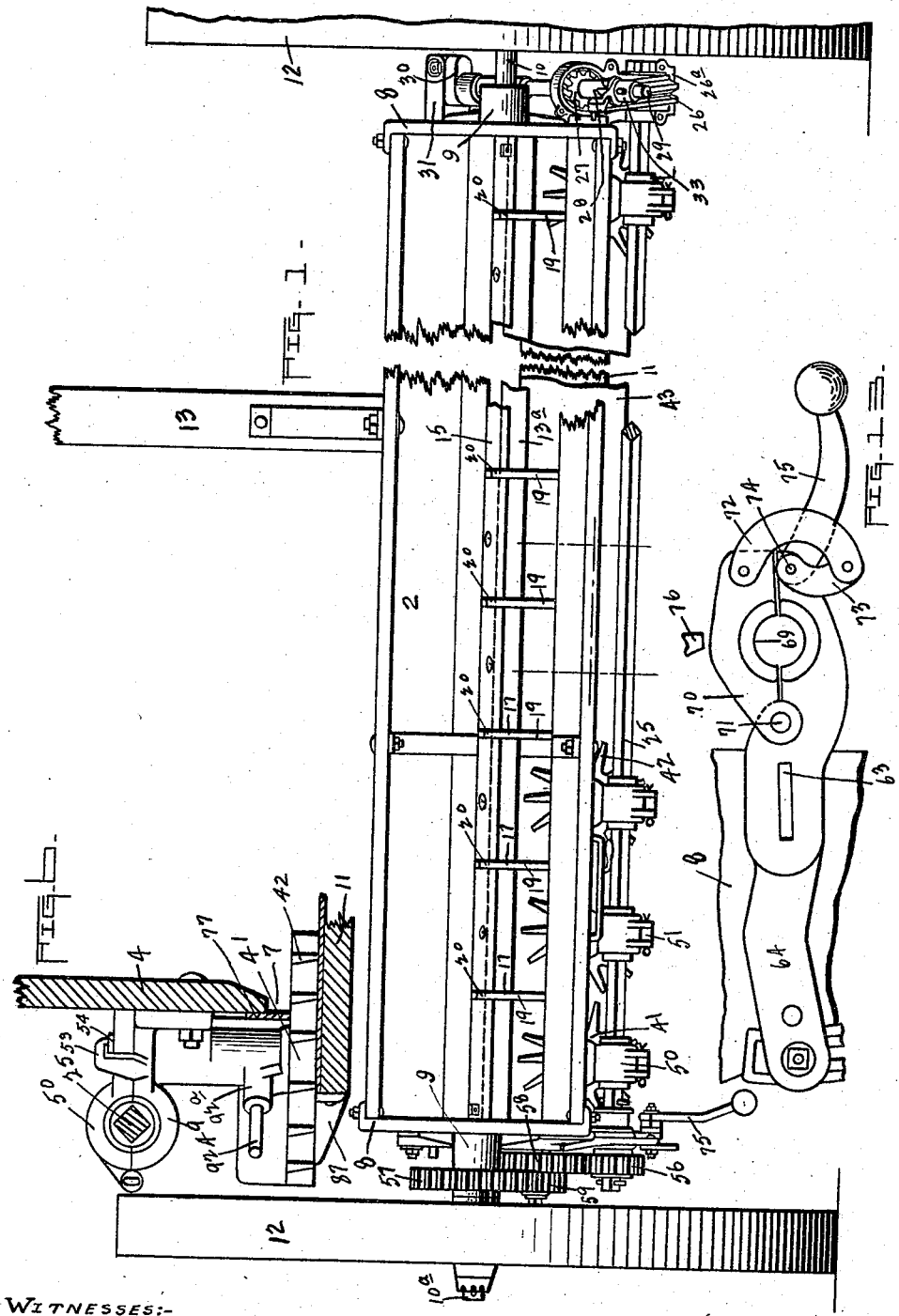

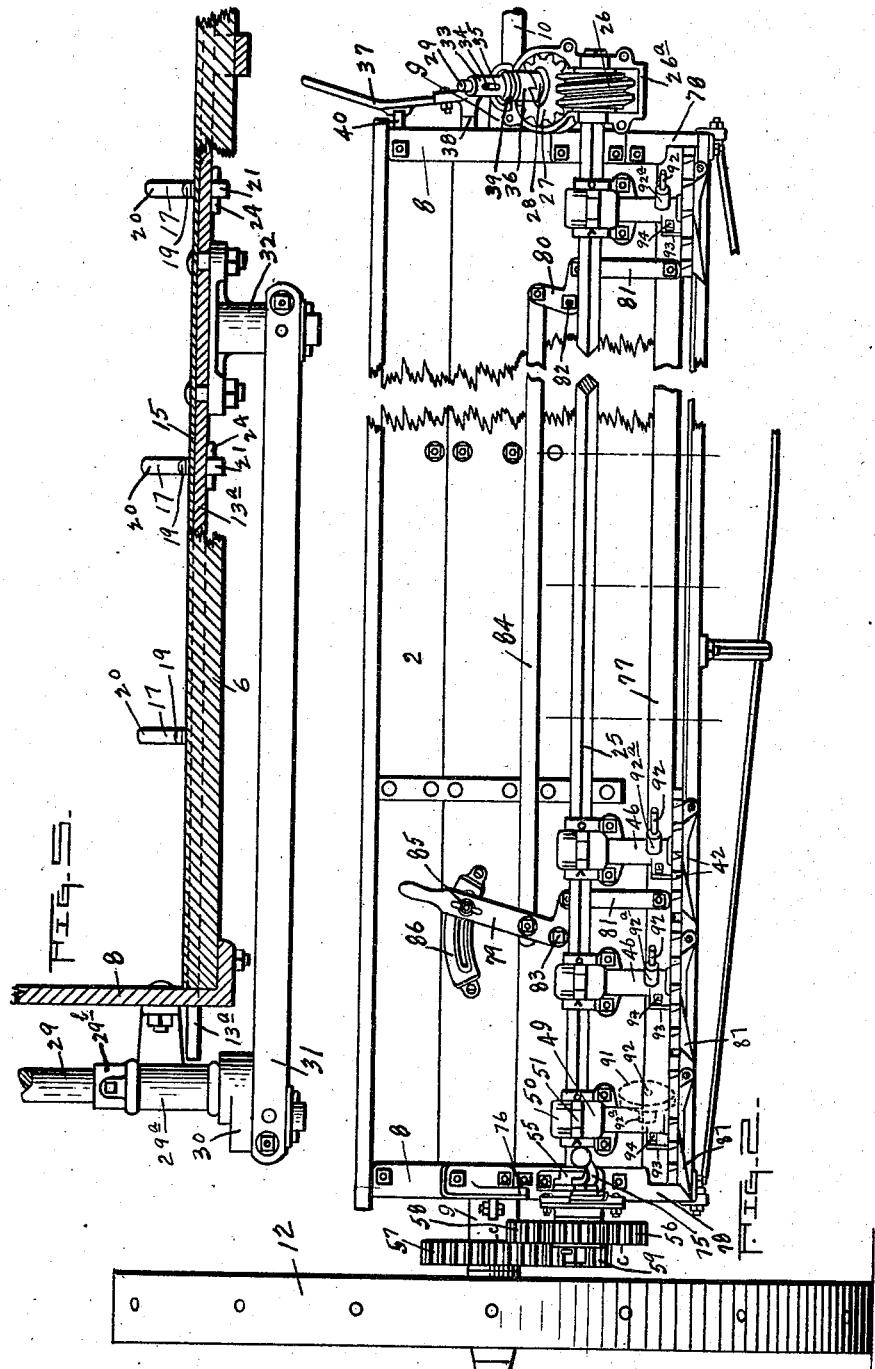

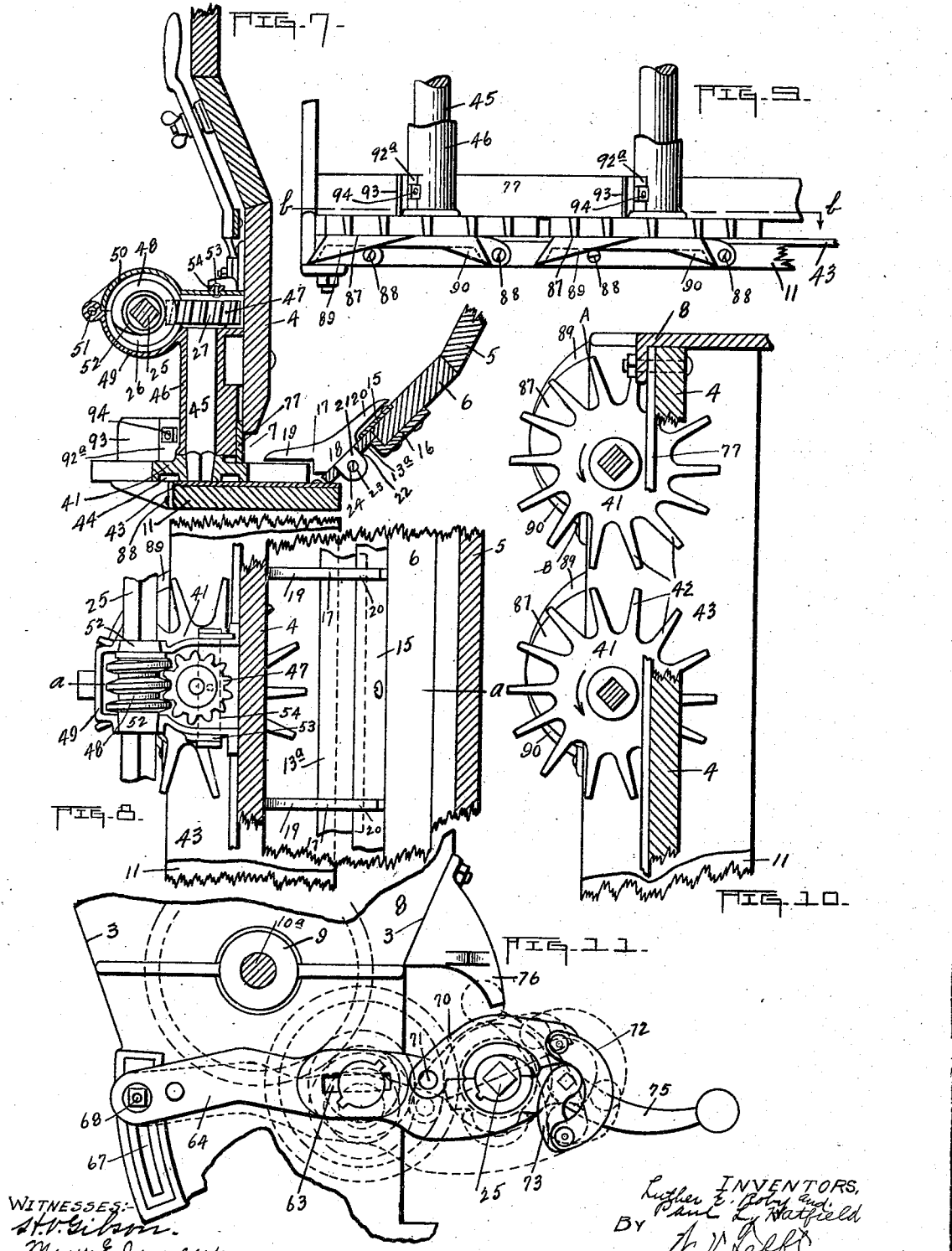

UNITED STATES PATENT OFFICE.

LUTHER E. ROBY AND PAUL L. HATFIELD, OF PEORIA, ILLINOIS.

FERTILIZER-DISTRIBUTER.

1,185,133.  Specification of Letters Patent.  Patented May 30, 1916.

Application filed August 11, 1915. Serial No. 44,901.

*To all whom it may concern:*

Be it known that we, LUTHER E. ROBY and PAUL L. HATFIELD, citizens of the United States, residing at Peoria, in the county of Peoria and State of Illinois, have invented certain new and useful Improvements in Fertilizer-Distributers, of which the following is a specification.

Our invention relates to fertilizer distributers.

The object of our invention is to provide a fertilizer distributer capable of distributing all kinds of fertilizer, including what is known as crop and permanent, but has special reference to a machine adapted to handle large and heavy loads of permanent fertilizer, as ground lime rock, ground rock phosphate and air slaked lime.

Our invention comprehends generally an organization of parts serviceable to effect the above purposes and specially to the organization of fingered distributing disks in conjunction with an adjustable member for controlling a discharge opening from a fertilizer container hopper, comprehending substantially the entire longitudinal limits of the machine; arcuate plates associated with the disk members, their eccentric arrangement in connection with said disks, their form and relative spacing of the same, the connection for driving the disks, including the manner of connection therewith, permitting ready disassembling or removal of the disks; special gear drive connections for the disks and manner of support of driving members, including an independent support for each of said driving members; the form of the fertilizer container having special reference to mechanical means for effecting deflection of materials; a reciprocating agitator member within the fertilizer container, including specially formed finger members; driving connections for the distributer disks and for the reciprocating member; special means for effecting or interrupting the driving connection for said distributer disks and the agitator member; and detail form of parts and general combinations to effect specific and general purposes looking to the complete result, which will be hereinafter more particularly pointed out.

Referring to the drawings—Figure 1 is a plan view of our invention; Fig. 2 is a front elevation of the same; Fig. 3 is a view from one end of the machine; Fig. 4 is a view from the opposite end to that shown in Fig. 3; Fig. 5 is a detail sectional view of the agitator bar and mechanism showing its connection with the fertilizer container and the driving connection therefor; Fig. 6 is a detail view, partly in section, showing the fertilizer distributer, the driving connection therefor and the means of supporting individual members of the driving connection in conjunction with a common driving element; Fig. 7 is a transverse sectional view, in part of the fertilizer container and associated parts taken on the line $a$—$a$ of Fig. 8; Fig. 8 is a longitudinal sectional view, in part, of the fertilizer container and the same associated parts as shown in Fig. 7, and with certain parts removed to better show interior construction; Fig. 9 is a front elevation specially designed to show the arrangement, form and special spacing relation of distributer and arcuate plate members; Fig. 10 is a sectional plan view on the line $b$—$b$ of Fig. 9; Fig. 11 is a detail view of special drive gear connection shown in Fig. 4 and illustrating certain adjustable relation of the parts to effect driving connection or disconnection; Fig. 12 is a sectional view on the line $c$—$c$ of Fig. 2; and, Fig. 13 is a detail view of a gear-carrying-arm and connected coöperating parts.

We are familiar with both the patent and practical art relating to the subject of fertilizer distributers, both in this and in foreign countries, and with the conditions that have in the past and now pertain to the use of such machines. Such knowledge advises that what is now known as crop or one-year fertilizer was almost universally used up to within the last few years. Latterly, what is known as permanent fertilizer has come quite generally into use.

Crop fertilizer is of such nature that it is absorbed and exhausted within a single crop season. Permanent fertilizer, which comprises such material as ground lime rock, ground rock phosphate and air slaked lime, is of such a nature that its disintegration and absorption is gradual, and when used, is not exhausted for a period of years. This latter character of fertilizer has been generally recommended by the Agricultural Departments of both the Federal and State Governments, for general field crops.

Comparatively, commercial fertilizer is much more expensive than permanent fertilizer, that is, in the sense as estimated from returns. The cheapness of permanent fertilizer has made possible its distribution in large quantities, that is, a large quantity of such fertilizer can be distributed at profit. Quantity and weight of permanent fertilizer desirable to be distributed has rendered earlier art fertilizer distributing machines ineffective. It is this fact that led to our development of the present machine.

While our invention is designed to distribute commercial fertilizer, it is built specially strong and has parts and special organization thereof adapting it particularly for distribution of permanent fertilizer, and it is to the production of a fertilizer distributer effective for distribution of fertilizer of all kinds that our invention is directed.

In the drawings, 2 refers generally to a hopper or container for fertilizing material, to be formed on general lines looking to the point of capacity and also to that of proper deflection of the materials. The upper portion of the hopper has a general rectangular shape. Its intermediate portion, as at 3, has upon either side a general approaching incline, as shown, and the lower portion— the rear side—has the vertically disposed wall 4 and the front side of said portion is formed into two sections 5 and 6, disposed at an incline respectively toward the lower rear end portion of the receptacle or hopper.

11 is a horizontally disposed bottom section which extends beyond the normal limits of the hopper serving as a closure member and also as a support for working parts, as will hereinafter be more fully explained. An opening as 7 is provided at the rear end of the hopper and at the lower portion thereof. Cast members 8 are provided at the ends of the hopper for the purpose of closure, said members being provided with the integrally cast socket members 9, into which respectively are fixed the stub axles or spindles 10 and 10ª. The complete box or container is supported upon wheels 12. Any suitable tongue, as 13, is provided, the same being connected with the receptacle 2 in any suitable manner to serve the purpose of a draft member.

13ª is an agitator member in the lower portion of the hopper and is adapted for reciprocation lengthwise of said hopper, and for the purpose of relieving it to some extent from the weight of the materials within the hopper, it is disposed in the relative inclined position shown. The agitator, extends lengthwise of the hopper and is of greater length than the latter, and protrudes through, and is supported in, slotted openings 14 in the closure members 8. A guideway is provided for said agitator member, comprising the plate 15 extending the length of the hopper, the same being secured to the front frame member 6 and overlying the upper edge of said agitator member, and angle plate members as 16 secured to the frame member 6 and extending inwardly and in contact with the face of said agitator member, there being a plurality of said plates disposed at intervals the length of the hopper. Disintegrator members 17 are provided at spaced distances apart, comprehending substantially the length of the hopper, said disintegrator members being formed with the central body portion 18 and the finger portions 19 and 20 extending laterally, respectively, at each side of said body portion 18. Integral with the disintegrator members 17 are the lugs 21 which protrude through slotted openings 22 in the agitator member and are provided with perforations as 23. The disintegrators are secured to the agitator member by means of cotter pins as 24 in a relation to be readily detached and replaced in case said disintegrator members are broken.

In practice, it is designed that the hopper shall be filled with fertilizing material, as for instance, crushed rock, and the agitator member with its fingered members, is designed to agitate or cause disintegration of fertilizer material, and, because of its inclination, to deflect the same toward the opening 7 at the rear end of the hopper. To accomplish the desired reciprocation we have provided a driving connection from a driven shaft 25, comprising a worm 26 upon shaft 25, said worm supported in a sleeve portion of cast member 26ª, the latter supported in connection with end hopper closure member 8 through arm 26ᵇ; a worm wheel 27 registering with said worm 26 provided with a clutch member 28, said worm wheel being normally loose on shaft 29, supported in cast member 26ª and the box member 29ª; a spacing collar 29ᵇ designed to fix the position of shaft 29 relative to its support; a crank member 30 fixed to shaft 29, a pitman 31 connecting said crank member with a stud 32 secured to said reciprocating member. For the purpose of effecting a driving connection between worm wheel 27 and shaft 29 that may be interrupted at pleasure, the sleeve 33 is provided, having a slidable relation upon said shaft, and held against turning by means of pin 34 in way 35, said way allowing the sleeve to slide upon said shaft. The sleeve 33 is provided with a clutch member 36 adapted to engage at times with clutch member 28, on the worm wheel 27. To facilitate the shifting of sleeve member 33, a lever 37 is provided, pivoted intermediate its length to stud 38 secured to cast member 8, said arm being furcated at its lower end and engaging a grooved way 39 in sleeve 33. Notched rack 40 secured to cast member 8 serves, in conjunction with said lever, to secure lever 37 in the proper position to effect either engagement or disengagement of clutch members 28 and 36, respectively, as desired. This disengageable connection between shaft 25 and the agitator member 13ª is serviceable under conditions when the material within the hopper has become hardened and adherent to the agitator member, which might make it difficult to give the initial start or movement to the agitator member from the transporting power without danger of breakage. The capability of disconnection enables the operator to put the agitator member to an initial movement by means of a hammer or the like struck against the protruding end or ends of said member, the circumstance of such disconnection preventing resistance of the complete driving train that leads to the traction wheels, such connection to be hereinafter fully explained.

For the purpose of effecting a uniform distribution of materials, either by gravity or deflection, that are brought to the opening 7 at the rear of the hopper, we have provided plural distributer members 41 arranged at and within opening 7 at spaced intervals the length of the hopper. These distributer members 41 are formed with radiating fingers 42, the same being tapered from the top face to the lower edge thereof for the purpose of affording greater carrying capacity between the same, and with their front faces substantially upon a line through the axes of the distributers, while their rear faces are disposed at a tangent from said axial center, such formation being for the purpose of presenting a front carrying surface approximating a line through the axis, and the widening of the teeth by the divergence from said center line is for the purpose of giving strength to the fingers.

43 is a plate preferably of metal secured to the upper face of bottom member 11, and is shown protruding somewhat beyond the outer wall of the hopper; however, it may be positioned to register substantially with the same. The distributers, in working position, rest and turn upon this plate, and to minimize friction as much as possible, the central body portion of said distributers is channeled or cut away as at 44. The position of the several distributer members is defined by the vertical shafts 45 and the lower ends of sleeve members 46, the latter being spaced from plate 43 sufficiently only to permit the insertion of said distributers.

In carrying out the purposes of our invention, the several distributers are designed to be driven simultaneously for the purpose of withdrawing fertilizer material from the bottom of the hopper to be distributed upon the ground. To effect a turning of the distributers, a driving connection is provided, comprising the vertical spindles 45 squared at their lower ends for seating in similar squared openings in the distributer members; the worm wheels 47 fixed to the upper end of spindles 45, the worms 48 loosely mounted on square shaft 25, said worms being provided with squared openings to conform with the shape of said shaft; a housing and support for these driving members including the squared shaft comprising a two part casing including cast member 49 integrally united to sleeve member 46, the complete member being securely bolted to rear wall 4 of the hopper, and member 50 being hinged as at 51 to member 49, serves to house the worm and worm wheel and sleeve 46 to shaft 45. Each of the worms 48 is formed at one end with a shoulder member 52, and the housing members 49 and 50 are each formed with a similar shoulder member to meet and abut with the shoulder portions 52 of said worms for the purpose of defining the position of said worms with relation to their interacting worm wheels, and to hold said worms against longitudinal movement upon shaft 25, there being provided the same character of housing and support against longitudinal movement of each of said worms upon said shaft 25 throughout the series so that each distributer member has an independent driving connection from shaft 25. It has been found to be impractical to secure worm members serving as driving connections, to distributer members upon a driving shaft, as the strain of the load is so great that said members cannot, in the ordinary manner of securing the same, upon shaft members, be maintained in a permanent position relative to its co-acting driven worm wheel, either because of movement upon the driving shaft or because of the movement of the driving shaft under the great strain of the load, hence we have provided this special support, independent of the shaft, against longitudinal movement of the worm and lateral movement or springing of the shaft.

It has been found necessary in practice that each distributer member shall be independently removable without disturbing the general driving connection, and to this end we have established the loose connection between spindles 45 and the distributer members, and have hinged member 50 of the housing so that it may be opened with reference to the other member 49 of the housing, to permit spindles 45 and their attached gear members 47 to be lifted free from said working position and entirely removed therefrom. We have provided interlocking members, comprising lugs 53 on the housings and the pivoted members 54 on the movable housing member 50 for this purpose. The movable member may be turned to engage, or be disengaged from, lugs 53 at will.

Worms 48, it will be observed, are supported in the housing members 49 and 50 which also serve to support shaft 25, and maintain it in proper working position. Upon the outer end (at the left looking toward the rear of the machine) shaft 25 is supported in bracket 55; the other end of said shaft is supported in worm 26, which is housed and supported in bracket 26ª. The shaft 25 is designed to be driven from tractor wheel 12 at varying speeds, as desired, said varying speeds being attained through interchangeability of gear driving members between said tractor wheel and said shaft 25. The particular connection for driving shaft 25 from the tractor wheel comprises gear wheel 56 secured to shaft 25, gear wheel 57, having an angularly formed interior hub portion, as shown in Fig. 4, that engages a similarly formed exterior hub portion of tractor wheel 12, intermediate gear wheels 58 and 59 splined on a common sleeve member 60 (see Fig. 12) said sleeve member being supported on bearing 61, which said sleeve in turn is fixed on bolt 62, the latter being supported in slot 63 of gear adjusting arm 64, said bolt and the parts it supports, being secured in connection with gear adjusting arm 64, by the application of a cap 65 and nut 66.

The gears comprising the connection between shaft 25 and the tractor wheel 12 are shiftable relatively for the purpose of effecting an engagement or disengagement of the driving connection to facilitate working relation of the parts or disengagement while the machine is being transported, or for other reasons that may arise in the service of the machine. The particular mechanism, and mode of operation of the parts to effect this purpose is as follows: The gear adjusting arm 64 is supported in a slotted way 67 in cast member 8, by means of bolt 68. The forward end of arm 64 has a normal rest through the engagement of the arcuate shaped portion 69 of member 70 on a projecting boss of bearing bracket 55, and is pivoted to arm 64 as at 71, the forward ends respectively of arm 64 and member 70 being connected by means of a link 72 having a pivoted connection with member 70 and with arm 73, journaled to the forward end of arm 64. To the journal or support 74 for arm 73 is fixed the lever 75, manipulation of which will cause the forward end of arm 64 and member 70 to be spaced apart relatively, and for the purpose of limiting the upward movement of member 70 the stop bracket 76 is provided supported from cast member 8. The movement of lever 75 in the proper direction to space arm 64 and member 70 apart will bring member 70 into contact with stop or bracket 76, and a further movement of said lever 75 will serve to move arm 64 downwardly, causing a separation of gears 57 and 59, the relation of gears 56 and 58 being such that the movement of arm 64 will not disturb their normal driving relation. When such disconnection is effected between gears 57 and 59, shaft 25 and the train of gears leading to gear 57 will be idle, even though the tractor wheels may be turning. A reverse movement of lever 75 will serve to throw gears 57 and 59 into mesh and into working relation to drive shaft 25 and other connected working elements of the machine action.

To effect an interchange of gears for the purpose of changing the speed of drive of the working parts of the machine, we have provided for the adjustment of gear carrying arm 64 in connection with the slot 67 in cast member 8. It will be seen that by shifting arm 64 to different positions within slot 67, gears to perform the function of gears 56, 58 and 59 may be substituted. The support for gears 58 and 59 is adjustable in slot 63 of arm 64 to facilitate the proper spacing or the establishment of the proper working relation of the train of driving gears. This substitution is aided by the capability for separation of gears 57 and 59, which separation is effected before the substitution is made.

It will be observed that the distributer members 41 are arranged within the discharge outlet or way 7, and are designed in operation to withdraw for distribution materials from the hopper, that lodge between the fingers of or upon said distributers. The way 7 is made of sufficient height to facilitate discharge and distribution of varying quantities as desired. We have provided a control for this discharge opening or way, comprising the bar 77 which extends the full length of the opening, and is carried in said opening, and held against outward deflection by bearing relation at its ends with the flange portion 78 of cast members 8, and at intermediate points with the cast member 46, and is supported from crank arms 79 and 80 by means of pivoted crank bars 81, said crank arms being pivoted to the frame of the hopper as at 82 and 83. The bar 84 pivotally connects said crank arms, as shown. Crank arm 79 is elongated and provided with a stop member 85, which coöperates with a notched plate 86, whereby movement of crank arm 79 will serve to raise or lower bar 77 for the purpose of increasing or diminishing the width of the exit opening.

Looking to the point of uniform distribution, we have provided a series of specially designed plates 87, each disposed to work in conjunction with one of the distributer members, and secured to bottom framing member 11 by proper securing means, as for instance, screws 88, said plates being designed to register with the lower faces of the distributer members. Plates 87 have a general arcuate shape, and are disposed relative to the distributers on off centers or in an eccentric relation thereto, the design in such an arrangement being that said plates shall constitute a gradually diminishing or receding bottom or base support for the material carried between the fingers of the distributer members, from the initial point A of distribution to the maximum point B thereof, that is, as the finger members of the distributers withdraw the material from the hopper, the support for the load carried between them will gradually be withdrawn as the fingers advance about the arcuate plate, thus permitting gravity to act on the material. Due to the necessary spacing of the distributer members at least some distance apart, and owing to the fact that the eccentric disposition of plates 87 makes it necessary to space said plates likewise some distance apart, the outwardly and oppositely inclined flange members 89 and 90 are provided in conjunction with said plates to cause a deflection of the material to compensate for the necessary spacing of said plates 87. Because of the form of plates 87 and their relative disposition in connection with the distributer members, a gradual dislodgment of fertilizer material will be effected as the distributers move about said plates, the coöperation of said distributer and arcuate plate members in conjunction with the inclined deflector portion of said plates serving to effect a gradual and equal distribution feed or deposit of fertilizer material.

To insure against the clinging or wedging of materials between the finger members of the distributers 41, which might result from the nature of the material being distributed, or through changing conditions of weather, or as a result of the materials becoming wet, we have provided the fingered expulsion members 91 supported from spindles 92, the latter connected with cast members 92ª integral with cast member 46. The fingers of these expulsion members 91 are spaced relative to the fingers of the distributers 41 so that as the latter revolve, the fingers of said expulsion members will successively project within the spaces of the fingers of said distributer members to expel the material therebetween and contact of the fingers of the distributer members with the fingers of the expulsion members cause the latter to be turned.

To prevent lodgment of materials upon the upper surface of the distributer members 41 and the fingers thereof, we provide scraper members 93 disposed above the distributer members and secured to lug 94, which is part of cast member 46.

As the form and arrangement of parts of the device, except as herein specifically designated as material, is not essential to the general plan herein outlined, we do not wish to confine ourselves to form or arrangement of such parts, but claim as our invention all structural embodiments and resultant functional capabilities that fall legitimately within the principle herein outlined.

What we claim is:

1. In a fertilizer distributer, in combination, a hopper provided with an opening for lateral discharge at its lower portion, a supporting plate forming the lower side wall of said opening, a plurality of distributers supported upon said plate and spaced at intervals co-extensive with the length of said discharge opening, a driving shaft, independent driving connections between the drive shaft and each of the distributers including a spindle, a worm wheel on each spindle and a worm, said worms being supported on the drive shaft in a non-turnable relation but normally slidable thereon, an independent support for each set of driving connections for the distributers, each serving as a lateral support for the drive shaft, and comprising a cast member formed of two separable parts one fixed to the hopper and formed to embrace the spindle, the worm wheel, the worm and the drive shaft, a portion abutting against one end of said worm, said cast member serving to house the driving parts, to hold the driving shaft against lateral movement intermediate its ends and to hold the worms on said driving shaft against longitudinal movement under the force of the driving action of the parts, and means for actuating the drive shaft.

2. In a fertilizer distributer, in combination, a hopper provided with a discharge opening at its lower portion, a supporting plate forming the lower boundary of said opening, a plurality of distributers supported upon said plate and spaced at intervals co-extensive with the length of said discharge opening, a reciprocating agitator member in the bottom portion of the hopper provided with a plurality of disintegrator members spaced at intervals the length of said agitator, a common drive shaft, angular in cross section, for the distributer members and the agitator member, suitable interruptible driving connections from said drive shaft to the agitator member, a support and driving connection between the drive shaft and the distributer members including a spindle, a worm wheel on each spindle, a series of worm members on the drive shaft each registering with one of said worm wheels, the worms being non-turnably sleeved upon the drive shaft but normally slidable thereon, an independent support for each set of driving connections for the distributers each serving also as a support for the drive shaft and comprising a cast member fixed to the hopper and comprising two separable parts, formed to embrace the spindle, worm wheel, worm, and drive shaft and to abut against one end of the worm, said support serving as a housing for the connecting gear, to hold the driving shaft against lateral movement intermediate its ends, and to hold the worms thereon against longitudinal movement under the force of a driving action of the parts, and means for actuating the drive shaft.

3. In a fertilizing distributer, in combination, a truck, a hopper thereon provided with a discharge way at its lower and rear portion co-extensive with the length thereof, a reciprocating agitator member in the bottom portion of the hopper provided at intervals of its length with disintegrator fingers, a bearing plate at the bottom of the hopper and at the rear edge thereof, and extending the length of the discharge opening therefrom, distributer members spaced at intervals upon said plate the length of said discharge opening, and formed at its outer edge into spaced fingered portions and with a central angular opening, a common angularly formed drive shaft for the agitator member and the distributers, means for establishing intermittent driving connection between the drive shaft and the agitator member, whereby the latter may be disconnected, driving members for the distributers loose upon the drive shaft, means fixed on the hopper for supporting each of said driving members independently against longitudinal movement upon the drive shaft and the same means for supporting the drive shaft, holding it against lateral movement, and means interruptedly connecting the drive shaft with a wheeled member of the truck that the former may be driven from the latter, or may be disconnected at will.

4. In a fertilizer distributer, in combination with a hopper provided with a discharge opening at its lower portion, of a supporting plate forming the lower wall of said opening, a series of distributers supported upon said plate and spaced at intervals throughout the length of said opening, driving connections for said distributers, including a driving shaft, squared in cross section, spindles having a driving connection respectively each with one of the distributers, a worm wheel on each spindle and worms registering respectively each with a worm wheel and mounted loosely upon said shaft to be driven thereby, and means fixed on the hopper, independent of the driving shafts for supporting said worms and holding them against longitudinal movement on said shaft, the same means forming a common housing for registering worm and worm wheels.

5. In a fertilizing distributer, in combination, a hopper, its bottom portion comprising a horizontally positioned wall and an inclined wall portion, said hopper being provided with an opening for lateral discharge at its lower portion extending the length thereof and adjacent the horizontally disposed wall portion, an agitator member comprising a bar, disposed substantially in parallel relation with the inclined bottom portion of the hopper and extending lengthwise of the same, a plurality of finger members secured to said bar and projecting laterally therefrom in spaced relation to each other, a plurality of distributer members supported upon the horizontally disposed bottom portion of the hopper, and lying within the discharge opening therefrom, a common drive shaft for the distributer and agitator members, means connecting the drive shaft with the agitator member in a relation to cause the latter to be reciprocated within the hopper, and means connecting the drive shaft independently with each distributer to cause the latter to be driven.

6. In a fertilizer distributer, in combination, a hopper, its bottom portion comprising a horizontally positioned wall and a wall portion inclined thereto, said hopper being provided with an opening for lateral discharge at its lower portion, extending the length thereof, and adjacent the horizontally disposed bottom part, an agitator member comprising a bar disposed substantially in parallel relation with the inclined bottom portion of the hopper, and extending lengthwise of the same, a plurality of finger members secured to said bar and projecting laterally therefrom in spaced relation to each other, a plurality of distributer members supported upon the horizontally disposed bottom portion of the hopper and lying within the discharge opening therefrom, a common drive shaft for the distributer and agitator members, means connecting the drive shaft with the agitator member in a relation to cause the latter to be reciprocated within the hopper, worms supported loosely upon the drive shaft, driving connections between each worm and one of the distributers for driving the latter, and means connected with the hopper for housing the gear and gear connections from the drive shaft to the distributers, serving to support the drive shaft against lateral movement, and for holding the worms against longitudinal movement thereon.

7. In a fertilizer distributer, in combination, a hopper, a plate forming a portion of the bottom thereof, and extending beyond the rear wall, an opening for lateral discharge at the lower portion of said hopper being formed adjacent said plate and extending substantially the length of the hopper, distributer members disposed at spaced intervals the length of said discharge opening and supported upon said plate partly within and partly without the hopper, spindles connected respectively each with one of said distributers in a detachable relation, a drive shaft, driving connections between said shaft and said spindles and arcuate plate members disposed beneath the distributer members in eccentric relation thereto forming at first a complete then a progressively lessening support for the material to be distributed.

8. In a fertilizer distributer, a hopper provided with side and end closure walls, a discharge opening therefrom being provided in one of the side walls, and at the lower extremity thereof, extending substantially the length of the hopper and with a bottom closure comprising a horizontally disposed member, a portion thereof underlying the discharge opening, and a member angularly disposed with relation to said horizontally placed member, and inclining toward the latter, an agitator bar disposed adjacent to the angularly disposed portion of said bottom and conformably inclined therewith, said bar extending the length of the hopper and projecting beyond the limits thereof and being supported at its end portions in guideways in the end members of said hopper, said bar being provided with disintegrator members disposed at intervals throughout the length of the portion of said bar lying within the hopper, a drive shaft, and interruptible connections between said drive shaft and the agitator member, whereby the latter may be actuated for reciprocation lengthwise of the hopper from the former, to facilitate through the action of the parts, proper disintegration of materials within the hopper, and through the inclination of the said bottom portion of the hopper, to deflect materials to the horizontal bottom portion thereof, and further to facilitate, when the driving connection is interrupted, the application of a manual driving force to impart initial longitudinal movement of the agitator bar, a plurality of distributer members supported upon the horizontally disposed bottom member, lying within the discharge opening from the hopper and projecting beyond the outer edge of said bottom supporting member, driving connections from the drive shaft to the distributer members, and means for actuating said drive shaft.

9. In a fertilizer distributer, a hopper provided with side and end closure walls, a discharge opening therefrom being provided in one of the side walls, and at the lower extremity thereof, extending substantially the length of the hopper, and with a bottom closure including a horizontally disposed member, a portion thereof underlying the discharge opening, and a member angularly disposed with relation to said horizontally placed member and inclining toward the latter, an agitator bar disposed adjacent to the angularly placed portion of said bottom and conformably inclined therewith, said bar extending the length of the hopper and projecting beyond the limits thereof and being supported at its end portions in guideways in the end members of said hopper, said bar being provided with disintegrator members disposed at intervals throughout the length of the portion of said bar lying within the hopper, a drive shaft, and interruptible connections between said drive shaft and the agitator member, whereby the latter may be actuated from the former for reciprocation lengthwise of the hopper, to facilitate through the action of the parts, proper disintegration of the materials within the hopper, and through the inclination of the said bottom portion of the hopper, to deflect materials to the horizontal bottom portion thereof, and further to facilitate, when the driving connection is interrupted, the application of a manual driving force to impart initial longitudinal movement of the agitator bar, a plurality of distributer members supported upon the horizontally disposed bottom member, lying within the discharge opening from the hopper and projecting beyond the outer edge of said bottom supporting member, arcuate shaped members extending from the outer edge of said horizontally disposed bottom member, lying below the distributer members and disposed in eccentric relation to the axes thereof and arranged to support the whole of the material to be distributed as the distributers emerge from the hopper, said support gradually lessening as the distributers rotate and finally disappearing on their reëntrance into the hopper, driving connections from the drive shaft to the distributer members, and means for actuating said drive shaft.

10. In a fertilizer distributer, a hopper provided with side and end closure walls, a discharge opening therefrom being provided in one of the side walls, and at the lower extremity thereof, extending substantially the length of the hopper, and with a bottom closure including a horizontally disposed member, a portion thereof underlying the discharge opening, and a member angularly disposed with relation to said horizontally placed member, and inclining toward the latter, an agitator bar disposed adjacent to the angularly disposed portion of said bottom and conformably inclined therewith, said bar extending the length of the hopper and projecting beyond the limits thereof and being supported at its end portions in guideways in the end members of said hopper, said bar being provided with disintegrator members disposed at intervals through the length of the portion of said bar lying within the hopper, a drive shaft angular in cross section, interruptible connections between said drive shaft and the agitator member, whereby the latter may be actuated for reciprocation lengthwise of the hopper from the former, to facilitate through the action of the parts, proper disintegration of the materials within the hopper, and through the inclination of the said bottom portion of the hopper to deflect materials to the horizontal bottom portion thereof, and further to facilitate, when the driving connection is interrupted, the application of a manual driving force to impart initial longitudinal movement of the agitator bar, a plurality of distributer members supported upon the horizontally disposed bottom member, lying within the discharge opening from the hopper and projecting beyond the outer edge of said bottom supporting member, spindles connected with the distributer members in a detachable relation, provided each with a worm wheel thereon, worms loosely mounted upon the drive shaft provided with angular, longitudinally disposed openings in conformity with the angular formation of the drive shaft, each of said worms of the series registering with one of the worm wheels upon the spindles, and means connected with the hopper for housing and supporting said driving connections and likewise for supporting the drive shaft against lateral movement of said shaft, and means for actuating the drive shaft for rotation.

11. In a fertilizer distributer, a hopper provided with side and end closure walls, a discharge opening therefrom being provided in one of the side walls, and at the lower extremity thereof, extending substantially the length of the hopper, and with a bottom closure including a horizontally disposed member, a portion thereof underlying the discharge opening, and a member angularly disposed with relation to said horizontally placed member, and inclining toward the latter, an agitator bar disposed adjacent to the angularly disposed portion of said bottom and conformably inclined therewith, said bar extending the length of the hopper and projecting beyond the limits thereof and being supported at its end portions in guideways in the end members of said hopper, said bar being provided with disintegrator members disposed at intervals throughout the length of the portion of said bar lying within the hopper, a drive shaft angular in cross section, interruptible connections between said drive shaft and the agitator member, whereby the latter may be actuated from the former for reciprocation lengthwise of the hopper, to facilitate through the action of the parts, proper disintegration of the materials within the hopper, and through the inclination of the said bottom portion of the hopper to deflect materials to the horizontal bottom portion thereof, and further to facilitate, when the driving connection is interrupted, the application of a manual driving force to impart initial longitudinal movement of the agitator bar, a plurality of distributer members supported upon the horizontally disposed bottom member, lying within the discharge opening from the hopper and projecting beyond the outer edge of said bottom supporting member, spindles connected with the distributer members in a detachable relation, each provided with a worm wheel thereon, worms loosely mounted upon the drive shaft provided with openings conforming with the angular formation of the drive shaft, each of said worms of the series registering with one of the worm wheels upon the spindles, and means connected with the hopper for housing and supporting said driving connections and likewise for supporting the drive shaft against lateral movement, comprising a two-part cast member, one fixed to the hopper and the other detachably secured to the former in a relation to be removed therefrom, to permit the withdrawal of the spindles that the distributers may be removed at will, and means for actuating the drive shaft for rotation.

12. In a fertilizer distributer, in combination, a hopper provided with a discharge opening at its lower portion extending longitudinally at one side thereof, a bottom member underlying said opening, an agitator member therein, a plurality of distributer members disposed at spaced intervals throughout the length of the discharge opening, and supported upon said bottom member, portions thereof projecting beyond the same, arcuate shaped members extending from the outer edge of said bottom member and arranged relatively to the distributer members in a plane below the same and in eccentric relation to the axes thereof, a drive shaft, interruptible driving connections between the drive shaft and the agitator member comprising a crank shaft, a pitman connecting the crank shaft with the agitator member, a worm wheel normally loose on the crank shaft provided with a clutch member thereon, a clutch splined upon said shaft, means for adjusting the same for engagement or disengagement of the clutch upon the worm, and a worm upon the drive shaft registering with the worm wheel on the crank shaft, independent driving connections for each of the distributer members, comprising spindles connected with said distributers, a worm wheel secured to each of said spindles, worms fixed on said drive shaft against rotation thereon, but normally slidable lengthwise thereof, suitable housing and supporting members for each driving connection from the drive shaft to the distributer members, fixed to the hopper and embracing said members in a manner to hold the drive shaft against lateral movement and the worms against longitudinal movement on the drive shaft, and means for operating the drive shaft.

13. In a fertilizer distributer, in combination, a hopper provided with a discharge opening at its lower portion extending longitudinally at one side thereof, a wheeled support for the hopper, an agitator member within the latter and a horizontally disposed bottom member forming the lower closure side for said opening, extending outwardly beyond the said opening, a plurality of distributer members disposed at spaced intervals throughout the length of the discharge opening and supported upon said bottom member, portions thereof projecting beyond the same, arcuate shaped members extending from the outer edge of said bottom member and arranged relatively to the distributer members in a plane below the same and in eccentric relation to the axes thereof and arranged to support the whole of the material to be distributed as the distributers emerge from the hopper, said support gradually lessening as the distributers rotate and finally disappearing on their reëntrance into the hopper, a drive shaft, interruptible driving connections between the drive shaft and the agitator member, comprising a crank shaft, a pitman connecting the crank shaft with the agitator member, a worm wheel normally loose on the crank shaft provided with a clutch member thereon, a clutch splined upon said shaft, means for adjusting the same for engagement or disengagement of the clutch upon the worm wheel, and a worm upon the drive shaft registering with the worm wheel on the crank shaft, independent driving connections for each of the distributer members comprising spindles connected with said distributers, a worm wheel secured to each of said spindles, worms fixed on said drive shaft against rotation thereof, but normally slidable lengthwise thereof, a suitable housing, and supporting members for each driving connection from the drive shaft to the distributer members fixed to the hopper and embracing said members in a manner to hold the drive shaft against lateral movement and the worms against longitudinal movement on the drive shaft, and means for operating the drive shaft from the wheeled member of the support, comprising interruptible driving connections whereby driving relation may be established between said parts to operate said drive shaft or may be interrupted when the machine is being transported.

14. In a device of the class described, in combination, a hopper provided with a discharge opening at the lower portion of one of its side members and extending substantially the length of the hopper, a bottom member forming the lower boundary of said discharge opening, a plurality of distributer members supported upon the bottom member and projecting beyond the outer edge thereof, and spaced apart throughout the length of said opening, said distributer members comprising a central body portion and radial fingers spaced substantially equal distances apart, substantially arcuate shaped extension members from the outer edge of said bottom member disposed in a plane below the portions of the distributer members that extend beyond the edge of said bottom member and arranged eccentrically with relation to the axes of said distributer members, which form at first a complete, then a progressively lessening support for the material to be distributed, scraper members suitably supported in fixed position and in a relation to overly the upper face of the distributer members, an agitator member in the hopper, a drive shaft, means connecting the drive shaft with the agitator, to actuate the latter, and means connecting said drive shaft with the distributer members to actuate said members, and means for operating the drive shaft.

15. In a device of the class described, in combination, a hopper provided with a discharge opening at the lower portion of one of its side members and extending substantially the length of the hopper, a bottom member forming the lower boundary of said discharge opening, a plurality of distributer members supported upon the bottom member and projecting beyond the outer edge thereof, spaced apart throughout the length of said opening, said distributer members comprising a central body portion and radial fingers spaced substantially equal distances apart, substantially arcuate shaped extension members from the outer edge of said bottom member disposed in a plane below the portions of the distributer members that extend beyond the edge of said bottom member and arranged eccentrically with relation to the axes of said distributer members, scraper members suitably supported in fixed position and in a relation to overlie the upper face of the distributer members, a rotatable expulsion member provided with radially disposed fingers, suitably supported to be turned and the finger portions thereof to register successively with the spaces between the finger members of the distributers, and to be turned through the movement of the latter, an agitator member in the hopper, a drive shaft, means connecting the drive shaft with the agitator member to actuate the latter, and means connecting the drive shaft with the distributer members to actuate said members, and means for operating the drive shaft.

16. In a device of the class described, in combination, a hopper provided with a discharge opening therefrom, a plurality of distributer members disposed within said opening and spaced apart at intervals throughout the length thereof, a support for the distributer members, arcuate shaped extensions from its outer edge, arranged eccentrically with relation to the axes of said distributers, and means for actuating said distributer members to withdraw materials from the hopper and gradually distribute the same from the edge of the arcuate extensions which form at first a complete, then a progressively lessening support for the material to be distributed.

17. In combination, a hopper provided with a discharge opening therefrom, a plurality of distributer members disposed within and spaced apart at intervals throughout the length of said opening, a support for the distributer members, arcuate shaped extensions from its outer edge arranged eccentrically with relation to the axes of said distributers, said arcuate shaped extension members being provided with flared edge depending portions, a series of scraper members, one of such series being suitably supported for bearing relation over the upper face of each distributer member to dislodge materials therefrom, and means for actuating said distributer members to withdraw materials from the hopper and gradually distribute the same from the edge of the arcuate extensions which form at first a complete, then a progressively lessening support for the material to be distributed.

18. In a device of the class described, in combination, a hopper provided with an opening in one of the side walls thereof, a plurality of distributer members disposed in said opening, a support for the distributer members, arcuate shaped members projecting outwardly from said support and underlying outer portions of said members, and arranged in eccentric relation to the axes thereof, said arcuate shaped members having a flat upper surface in contact with the distributers and provided with depending flange portions bearing downwardly and laterally therefrom and formed from circumferential center to extremities of said members in gradually increasing arc dimension, the flat surfaces forming at first a complete, then a progressively lessening support for the material to be distributed.

19. In combination with a hopper having an opening at the bottom of its rear wall, a distributer member mounted to rotate in a horizontal plane into and out of the hopper through said opening, and an arcuate shaped member fixed to the hopper below the distributer and in eccentric relation thereto whereby it forms at first as said distributer rotates, a complete and then a progressively lessening support for the material to be distributed.

20. In combination with a hopper having an opening at the bottom of its rear wall and extending from end to end thereof, a plurality of distributer members mounted to rotate independently in a horizontal plane into and out of the hopper through said opening, and an arcuate shaped member fixed to the hopper below each distributer in eccentric relation thereto, each of said arcuate members having a flat upper surface in contact with a distributer and forming thereby a varying support for the material to be distributed which support is at first complete as the distributers rotate and then progressively lessens until it finally disappears.

In testimony whereof we have affixed our signatures in presence of two witnesses.

LUTHER E. ROBY.
PAUL L. HATFIELD.

Witnesses:
MARY E. COMEGYS,
H. V. GIBSON.

Copies of this patent may be obtained for five cents each, by addressing the "Commissioner of Patents, Washington, D. C."